United States Patent [19]

Meguro

[11] Patent Number: 4,958,278

[45] Date of Patent: Sep. 18, 1990

[54] METHOD FOR LOADING DATA OR PROGRAM TO A PLURALITY OF TERMINAL STATIONS

[75] Inventor: Shinichi Meguro, Kanagawa, Japan

[73] Assignee: International Business Machines Corporation, Armonk, N.Y.

[21] Appl. No.: 179,361

[22] Filed: Apr. 8, 1988

[30] Foreign Application Priority Data

May 11, 1987 [JP] Japan ................... 62-112683

[51] Int. Cl.$^5$ ............................. G06F 15/16
[52] U.S. Cl. .................. 364/200; 364/280.2; 364/284.4
[58] Field of Search ... 364/200 MS File, 900 MS File

[56] References Cited

U.S. PATENT DOCUMENTS 4,799,215 1/1989 Suzuki ................... 370/60
4,807,224 2/1989 Naron et al. ............ 370/94

OTHER PUBLICATIONS

*Data and Computer Communications*, by Stallings, copyright 1985, pp. 245-359 & 420-431.

Primary Examiner—Lawrence E. Anderson
Attorney, Agent, or Firm—Joscelyn G. Cockburn

[57] ABSTRACT

Described is an apparatus and method which allow multiple stations on a communications network to be Initial Program Loaded simultaneously from a server station. Thus, the method minimizes the time it would normally take to load the stations sequentially. Following the establishment of a program loading session between the server station and a station in the network, other stations requiring the program are allowed to participate in the session and receive any remaining portions of the program which have not yet been transmitted to the station. At the conclusion of the session, the server station retransmits, to the stations, that portion of the program which it had already transmitted at the time when the stations join the session.

2 Claims, 4 Drawing Sheets

METHOD FOR LOADING DATA OR PROGRAM TO A PLURALITY OF TERMINAL STATIONS

BACKGROUND OF THE INVENTION

1. Field of the Invention

The present invention relates to computer networks in general and more particularly to methods for distributing information within said network.

2. Prior Art

The prior art abounds with computer networks in which server stations transmit data bases to other stations connected to the network. FIG. 3 is an example of such prior art network. There is shown a local area network (LAN) in which relatively expensive server station 2, which has a non-volatile storage unit 1 such as a disk or diskette unit enabling it to store programs without dissipating them, is connected through wiring 5 to a plurality of relatively inexpensive terminal stations 4A, ... 4N, which do not have such storage unit 1, but has memory units 3, the contents of which dissipate when the power is turned off. Such terminal stations 4A, ... 4N in the computer system can be used as terminal stations only when they are remotely initial-loaded with a program from server station 2 as soon as the power turns on. Thus, each of terminal stations 4A, ... 4N request the initial program loading from server station 2 when the power is turned on.

In the conventional initial program loading technique, there is a problem in that, even if terminal station 4B issues an initial program loading request while another terminal station 4A is performing the initial program loading, because the initial program loading can be performed by only one teminal station at a time, terminal station 4B must wait until another terminal station completes the initial program loading, and the initial program loading for terminal station 4B is started only when it is completed for another terminal station. Stated another way, initial program loading is done sequentially. Thus, even if a station requests loading while another system is being loaded, the requesting station must wait until the loading of the other station is completed. This waiting unnecessarily extends the time that a station must wait to receive an initial program load from a server station must wait to receive.

That is, as shown in FIG. 4, when terminal station 4A first issues an initial program loading request at time $X_1$, a program is divided by frame (4 K bytes), and transmitted from server station 2 to terminal 4A. Every time the terminal station 4A receives a frame, it transmits acknowledge ACK to the server station. After it transmits the final frame, server station 2 transmits signal EOD, indicating the completion of program transmission, and terminal station 4A correspondingly transmits acknowledge ACK indicating the completion of initial program loading to server station 2. At this time $Y_1$, the initial program loading is completed for terminal 4A. During this period, for example, at time $X_2$, even if the user of terminal 4B turns on the power and requests the initial program loading, he must wait until time $Y_1$, and then the initial program loading is performed until time $Y_2$ by repeating the same steps as for terminal station 4A.

Therefore, if the users of terminal stations 4A and 4B turn on the power substantially at the same time, the user of the late terminal station 4B takes time $(Y_2 - X_2)$ for the initial program loading that is about two times of normal initial program loading time $(Y_1 - X_1)$. It is easily appreciated that, when N terminal stations are turned on at approximately the same time, the last station takes N times of the time required for the first one. Therefore, even when the initial program loading takes several seconds in normal time of $(Y_1 - X_1)$ if ten-odd terminal stations are turned on at approximately the same time, the initial program loading for the latest terminal station takes several minutes in certain circumstances, which is unbearable in practical use.

It is not such a rare circumstance for a number of terminal stations to be turned on at approximately the same time. It is commonly encountered, for example, in the case where terminal stations are simultaneously turned on at the start of a company or a school.

Therefore, the solution of this problem has been important in the conventional initial program loading technique.

SUMMARY OF THE INVENTION

It is thus the main object of the present invention to provide an apparatus and technique which allow programs and other information to be downloaded more rapidly than was heretofore possible.

More particularly, an object of the invention is to provide a method that can perform the initial program loading to each of a number of terminal stations in a normal duration of time, or in substantially the same duration of time as that required for performing the initial program loading when only one terminal station requests it, even if a number of terminal stations are turned on at approximately the same time and request initial program loading.

The method, according to the invention, wherein the initial program loading is separately performed from a server station to each of a plurality of terminal stations in response to individual request from them, comprises the following steps:

when one terminal station requests the initial program loading, initiating transmission of a program from the server station in response to the request in such a manner that all terminal stations can receive it, when another terminal station issues a request of initial program loading during initial program loading for one terminal station, causing another terminal station to start receiving of the program being transmitted from the server station from the middle, and causing the server station to transmit portions of the program not received by another terminal station sequentially after completion of the initial program loading for one terminal station.

According to the initial program loading method of the invention, even during the initial program loading for one terminal station, other terminal stations can be initial program loaded in the middle of it, and the server station transmits sequentially portions of the program not received by other terminal stations once it transmits the entire program to complete the initial program loading for one terminal station, so that other terminal stations later starting the initial program loading complete it only by taking only approximately the same amount of time as for the initial one terminal station.

DESCRIPTION OF PREFERRED EMBODIMENT

Figure 1:
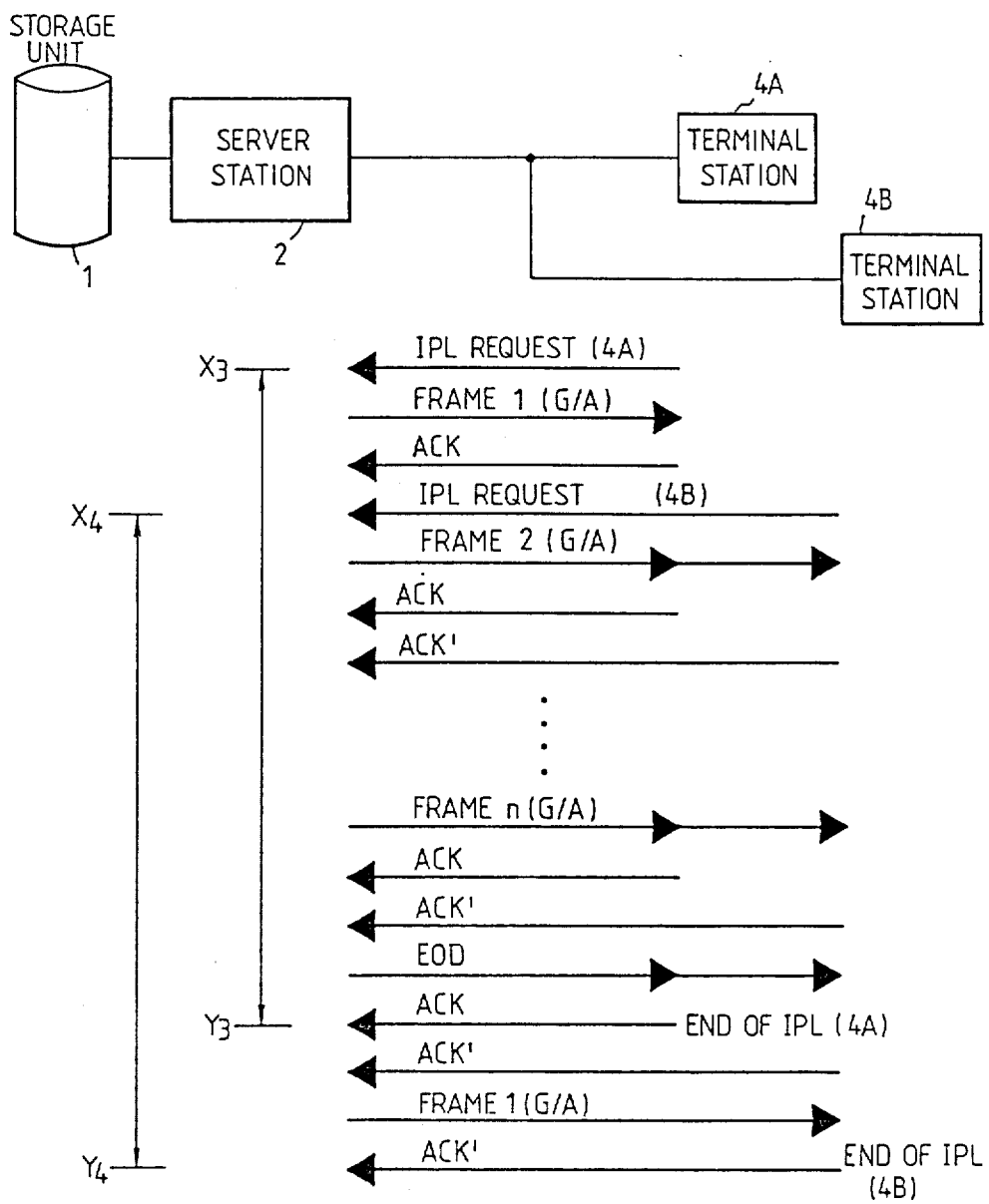
FIG. 1 shows an embodiment of the method of the invention performing the initial program loading to a plurality of terminal stations.
Figure 2:
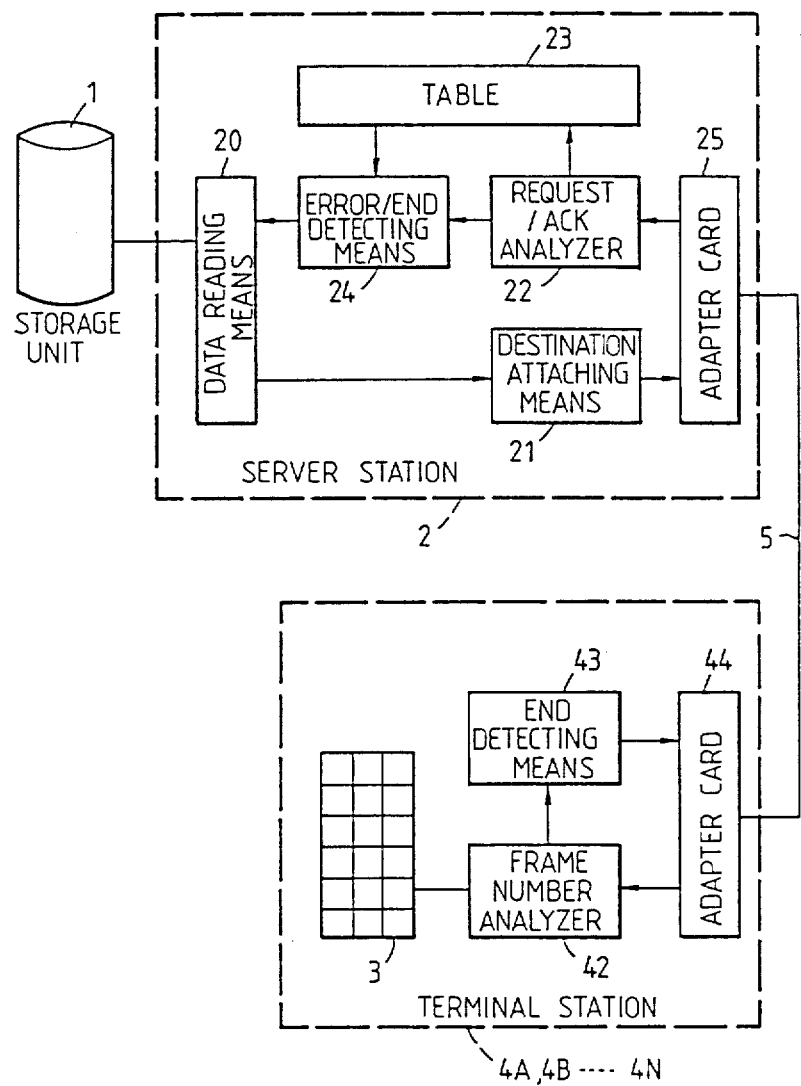
FIG. 2 shows a block diagram of a server station and terminal stations used for the embodiment.
Figure 3:
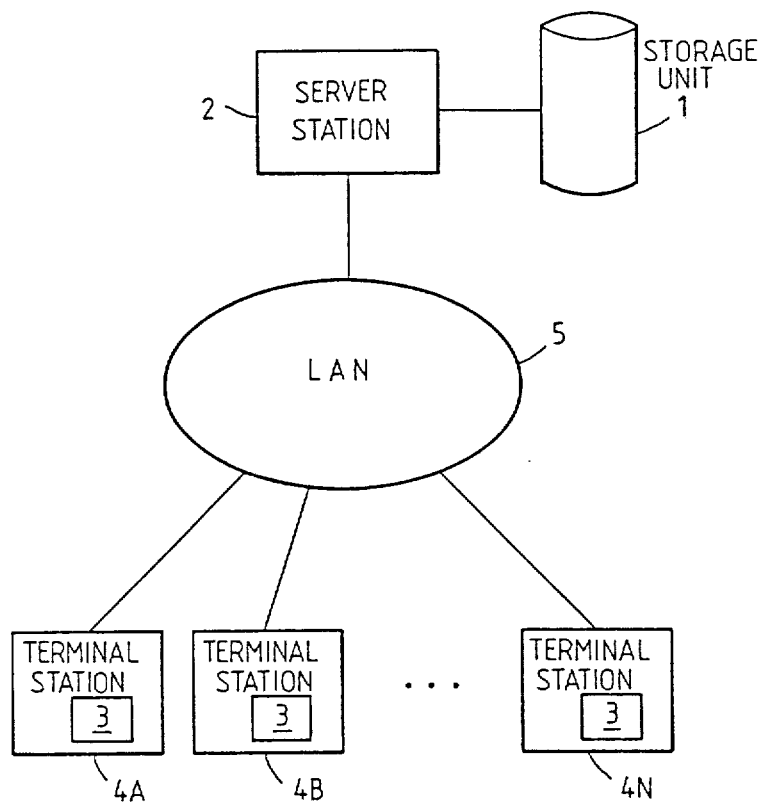
FIG. 3 shows a prior art computer system to which the method of the embodiment applies.
Figure 4:
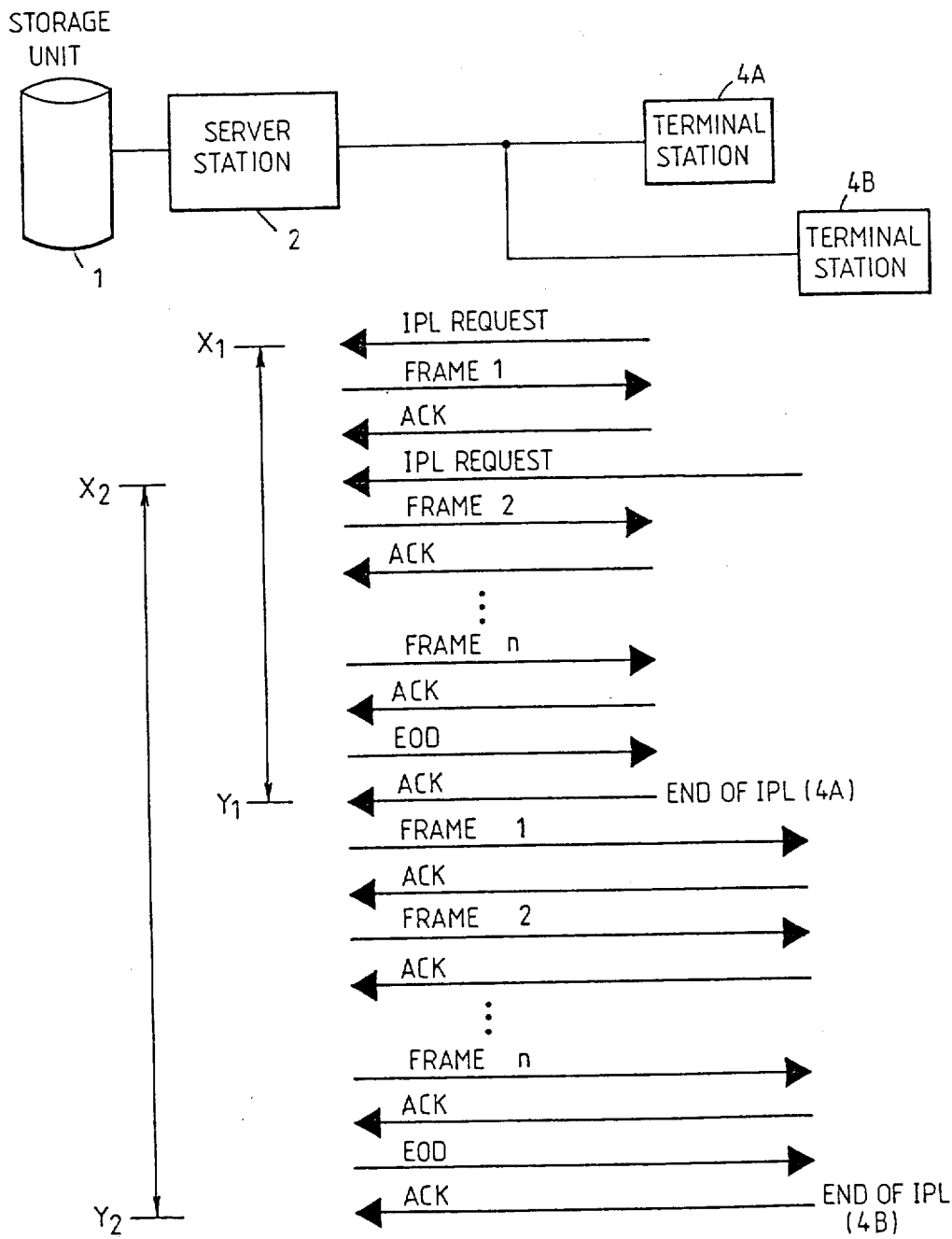
FIG. 4 shows a diagram illustrating a conventional initial loading method for a plurality of terminal stations.

FIG. 1 shows an embodiment of the initial program loading method for a plurality of terminal stations. Server station 2 and terminal stations 4A and 4B constitute the computer network of the local area network shown in FIG. 3. In practice, the number of terminal stations may be several tens or several hundreds. FIG. 2 shows configurations of server station 2 and terminal stations 4A, ... 4N that are used for the method of the invention. Server station 2 is a relatively expensive computer that has storage unit 1 such as a disk or diskette unit for storing programs without dissipating them. 20 is a means for reading data from storage unit 1. 21 is a means for attaching a destination to which terminal station the data or program is transmitted when server station 2 transmits it to the terminal stations 4A, ... 4N. Once the destination attaching means attaches a destination called a group address (G/A) to data or a program to be transmitted, all terminal stations of a predefined group can receive data or a program with the destination. That is, the use of this group address allows a program to be transmitted so that all terminal stations can receive it. 22 is a means for analyzing acknowledge ACK, indicating receipt of the initial program loading request from the terminal station or the program. 23 is a table for storing the terminal stations of the group, and store data indicating which terminal station issues the initial program loading, which terminal station completes the initial program loading, and, when a terminal station starts the initial program loading in the middle, a frame number of the portion of the program immediately before the start. The program transmitted from server station 2 to a terminal station for the initial program loading is divided into n frames of 4K bytes, each of which is provided with a frame number and sequentially transmitted. 24 is used to detect errors or completion of all operations of the initial program loading. 25 is an adapter card for the local area network.

Terminal stations 4A, ... 4N have memory units 3, the contents of which dissipate when the power is turned off. The memory unit is divided into n partitions of 4K bytes each and stores parts of an initial program loaded program in the order of the frame numbers. 42 is for analyzing frame numbers of the program transmitted from server station 2, and storing them in the corresponding partitions of memory unit 3. Structuring the memory and frames in accordance with the teachings of the present invention provides a quick and simple way for a terminal to determine whether or not it receives the entire program or frames of the program are missing. This benefit further lessened the time for downloading to multiple terminals. 43 is a means for detecting the end of the initial program loading. 44 is an adapter card for a local area network.

Referring to FIG. 1 again, the method of the embodiment is described. Now, at time $X_3$, the first terminal station 4A is turned on and issues an initial program loading request to server station 2. In response to the request, server station 2 attaches destinations of group addresses (G/A) to the program so that it can be received by all terminal stations, and sequentially transmits it in a form that it is divided into frame numbers 1 to n. When terminal station 4A receives each frame, it transmits acknowledge ACK to server station 2, and stores the program in the partitions of memory unit 3 in the order of the frame numbers. Table 23 of server station 2 reflects the fact that terminal station 4A has requested the initial program loading. When, at time $X_4$, another terminal station 4B is turned on and requests the initial program loading, it receives the program being transmitted from server station 2 from the next frame 2 in the same manner as terminal station 4A, and sequentially stores it in the partitions of its memory unit 3 corresponding to the frame numbers. In this case, because terminal station 4B starts receiving from frame 2, it does not store the program in the first partition in memory unit 3 that should store frame 1, but sequentially stores it from the partition for frame 2, that is ahead of the first address by 4K bytes. Terminal station 4B similarly transmits acknowledge ACK' to server station 2 as it receives the frames of the program. Table 23 of server station 2 reflects the fact that terminal station 4B has requested the initial program loading, and has started loading from frame 2 after frame 1 of the program. When server station 2 completes transmission of frames from 1 to n, it transmits signal EOD indicating this fact. Because terminal station 4A stores sequentially from the first frame 1, it transmits at time $Y_3$ signal ACK indicating the completion of the initial program loading, and starts to run the loaded program. However, terminal station 4B started the initial program loading at frame 2 for initial program loading of terminal station 4A, and therefore has not yet received the first frame 1. This is recognized by server station 2 from table 23, and by terminal station 4B from an empty space in its memory unit 3. Thus, server station 2 transmits frame 1, which is at the beginning of the program and not received by terminal station 4B, after completion of the initial program loading for terminal station 4A. Terminal station 4B transmits acknowledge ACK' to server station when it receives frame 1. At time $Y_4$ terminal station 4B completes the initial program loading and starts to run the loaded program. Server station 2 knows from acknowledge ACK' from terminal station 4B that all initial program loading is completed, and stops the transmission.

As appreciated from the above description, when two terminal stations 4A and 4B are turned on and request initial program loading at approximately the same time, time $(Y_3 - X_3)$ required for the initial program loading for the first terminal station 4A is substantially equal to time $(Y_4 - X_4)$ required for the initial program loading for the second terminal station 4B, and thus approximately equal to the time when the server station performs the initial program loading for only one terminal station. It is easily understood that it is true for a case where more than two terminal stations are turned on at approximately the same time. Therefore, even if a plurality of terminal stations request the initial program loading at approximately the same time, the time required for the initial program loading when viewed from a user of a terminal station is that required for loading only to his station. Thus, the time for the initial program loading when viewed from the terminal station is never extended even when the terminal stations are turned on at approximately the same time. Although, in the description of the embodiment, the number of transmissions of acknowledge signal ACK is increased by the number of terminal stations performing the initial program loading, it does not access the disk or diskette unit, and therefore the increase of time due to this is almost negligible.

While the invention has been particularly shown and described with reference to the preferred embodiment thereof, it will be understood that various changes of form and details may be made therein without departing from the spirit and scope of the invention.

What is claimed is:

1. An apparatus for loading data or a program from a server station to each of a plurality of terminal stations in response to individual requests from said terminal stations comprising:

means for generating and transmitting from one terminal station to the server station a request message for loading of data or a program;

means for initiating transmission from said server station to said one terminal station and other terminal stations the data or the program;

means for receiving, at another terminal station, the data or the program which is being transmitted from said server station; only if said another terminal station issues a request to said server station for loading of the data or the program during loading of the data or the program for said one terminal station; and means for retransmitting from said server station portions of the data or the program not received by said another terminal station after completion of loading of the data or the program for said one terminal station.

whereby portions of the data or program sent by said server station before said another terminal station issued the request for loading are sent by said means for retransmitting from said server station to said another terminal station following the initial transmission such that said one terminal station and said another terminal station can receive data simultaneously when said another terminal station issues a request during transmission to said one terminal station.

2. A method for loading data or a program from a server station to each of a plurality of terminal stations in response to individual request from said terminal stations comprising the following steps:

generating and transmitting from one terminal station to the server station a request for loading of data or a program;

initiating transmission from said server station to said one terminal station the data or the program;

start receiving at another terminal station the data or the program which is also being simultaneously transmitted to said terminal station from said server station if said another terminal station issues a request to said server station for loading of the data or the program during loading of the data or the program for said one terminal station; and retransmitting from said server station to said another terminal station portions of the data or the program not received by said another terminal station after completion of loading of the data or the program for said one terminal station said portions having been sent by said server station before said another terminal station started receiving.

* * * * *